United States Patent
Lambert

(10) Patent No.: US 8,357,229 B2
(45) Date of Patent: Jan. 22, 2013

(54) PROCESS FOR THE PRODUCTION OF OXYGEN AT HIGH TEMPERATURE WITH MATERIALS OF THE MANGANESE OXIDES TYPE HAVING A LAMELLAR STRUCTURE

(75) Inventor: Arnold Lambert, Chavanay (FR)

(73) Assignee: IFP Energies Nouvelles, Cedex (FR)

( * ) Notice: Subject to any disclaimer, the term of this patent is extended or adjusted under 35 U.S.C. 154(b) by 221 days.

(21) Appl. No.: 12/965,317

(22) Filed: Dec. 10, 2010

(65) Prior Publication Data

US 2011/0142748 A1    Jun. 16, 2011

(30) Foreign Application Priority Data

Dec. 11, 2009  (FR) ...................................... 09 06013

(51) Int. Cl.
*B01D 53/02* (2006.01)

(52) U.S. Cl. ............ 95/138; 95/148; 423/219; 423/579; 502/400

(58) Field of Classification Search ............... 95/95, 96, 95/106, 138, 148; 423/219, 579; 502/400
See application file for complete search history.

(56) References Cited

U.S. PATENT DOCUMENTS

| | | | |
|---|---|---|---|
| 6,361,584 B1 * | 3/2002 | Stevens et al. ................... 95/96 |
| 6,824,575 B1 | 11/2004 | Otomo et al. | |
| 6,852,666 B1 * | 2/2005 | Bouly et al. ................... 502/304 |
| 7,153,345 B2 * | 12/2006 | Li et al. ........................... 95/137 |
| 7,700,517 B2 * | 4/2010 | Li et al. ......................... 502/324 |
| 2002/0179887 A1 * | 12/2002 | Zeng et al. ...................... 252/373 |
| 2003/0138747 A1 * | 7/2003 | Zeng et al. .......................... 431/2 |
| 2005/0176588 A1 | 8/2005 | Bulow et al. | |
| 2005/0176589 A1 | 8/2005 | Bulow et al. | |
| 2005/0226798 A1 | 10/2005 | Bulow et al. | |

FOREIGN PATENT DOCUMENTS

FR  2 895 272 A1  6/2007
WO  WO 2007/039687 A1  4/2007

OTHER PUBLICATIONS

Xiaojing Yang et al., Structural Characterization of Self-Assembled $MnO_2$ Nanosheets from Birnessite Manganese Oxide Single Crystals, Chemistry of Materials, Nov. 20, 2004, pp. 5581-5588, vol. 16, No. 26, XP002592969.

(Continued)

*Primary Examiner* — Duane Smith
*Assistant Examiner* — Christopher P Jones
(74) *Attorney, Agent, or Firm* — Antonelli, Terry, Stout & Kraus, LLP.

(57) ABSTRACT

The present invention relates to a process for separating oxygen at high temperature by means of a material comprising at least one compound according to the formula $A_xBO_{2-\delta} \cdot yH_2O$ with a lamellar structure composed of sheets generated by the sequence of octahedra connected to one another by the edges, whereby A is at least one of the elements IA or IIA of the periodic classification of elements, B is at least one of the elements IIIB to IIB of the periodic classification of the elements, $0 < x \leq 2$, $0 \leq y \leq 2$, and $-0.4 \leq \delta \leq 0.4$.

9 Claims, 1 Drawing Sheet

OTHER PUBLICATIONS

Anne-Claire Gaillot et al., Structure of the synthetic K-rich phyllomanganate birnessite obtained obtained by high-temperature decomposition of $KMnO_4$ Substructures of K-rich birnessite from 1000° C. experiment, Microporous and Mesoporous Materials, Jan. 5, 2007, pp. 267-282, vol. 98, No. 1-3, XP-002592970.

Stanton Ching et al., Sol-Gel Synthesis of Layered Birnessite-Type Manganese Oxides, Inorganic Chemistry, Feb. 25, 1997, pp. 883-890, vol. 36, No. 5, XP-002592971.

Xiong Han Feng et al., Synthesis of Birnessite From the Oxidation of $Mn^{2+}$ By $O_2$ in Alkali Medium: Effects of Synthesis Conditions, Clay and Clay Minerals, Apr. 1, 2004, pp. 240-250, vol. 52, No. 2.

\* cited by examiner

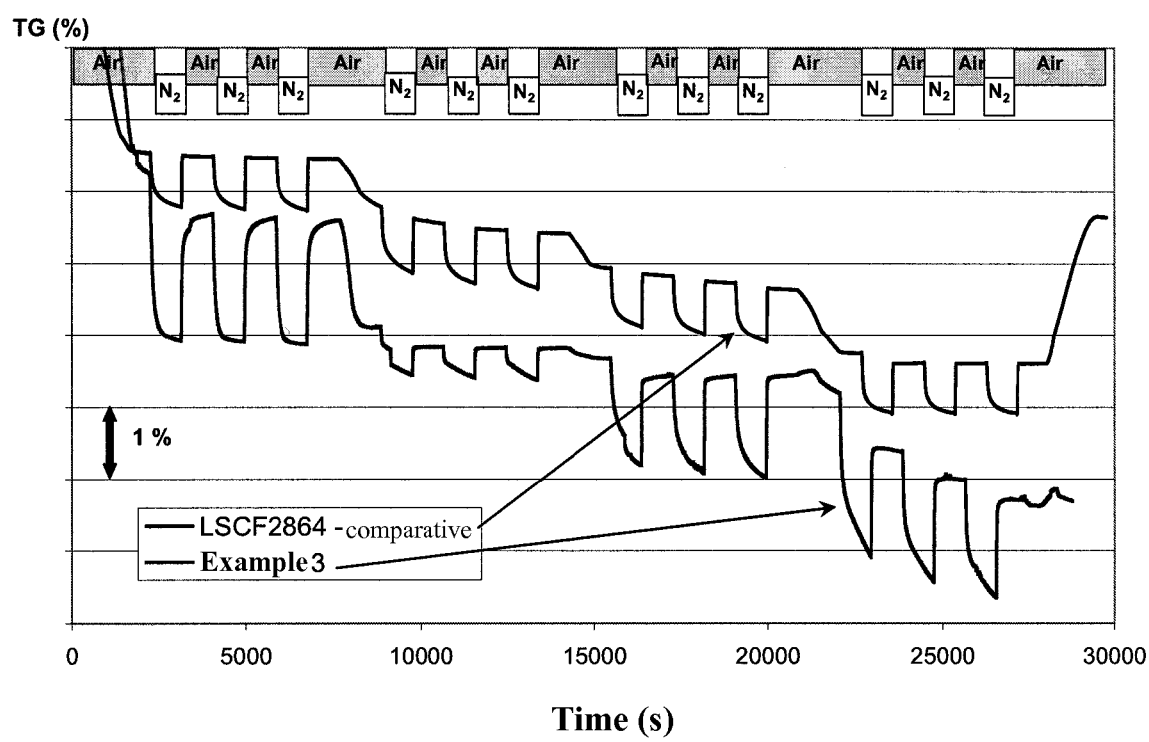

PROCESS FOR THE PRODUCTION OF OXYGEN AT HIGH TEMPERATURE WITH MATERIALS OF THE MANGANESE OXIDES TYPE HAVING A LAMELLAR STRUCTURE

The present invention relates to materials for high-temperature separation of oxygen, and particularly to materials comprising manganese oxides having a lamellar structure.

It more particularly relates to materials that can free a portion of their network oxygen in the form of $O_2$ gas, particularly when the partial pressure of oxygen to which they are subjected decreases and regenerates when the partial pressure of oxygen is restored.

In a context of increasing world energy demand, capture of carbon dioxide for sequestration has become an imperative necessity in order to limit greenhouse gas emissions harmful to the environment.

Oxycombustion is one of the promising processes for energy production involving $CO_2$ capture.

Such a process requires an oxygen production unit that can supply the oxycombustion chamber with oxygen, pure or diluted, in a $CO_2$ and/or steam stream, as described in patent WO 07/039,687 A, for example.

Another energy production process involving $CO_2$ capture is pre-combustion separation of CO2 by means of IGCC (Integrated Gasification Combined Cycle) type plants.

As described in the U.S. Pat. No. 6,824,575, this technology requires, as for oxycombustion, the use of an oxygen production unit that can supply a gasification unit with oxygen, pure or diluted, in a steam and/or $CO_2$ stream.

The production of synthesis gas ($CO+H_2$) from various carbon-containing raw materials such as coal, petroleum, natural gas, biomass, is a key stage in the production of synthesis fuels or hydrogen, which requires oxygen as free of nitrogen as possible so as to avoid diluting the synthesis gas obtained.

In all these cases, it is important to avoid, or at least to minimize, the presence of nitrogen. On the other hand, it can be advantageous to use a mixture of oxygen and of an inert gas, which can be steam and/or carbon dioxide, easy to separate from oxygen or that can be used as they are, depending on applications.

Currently, the most commonly used technology for production of sufficient amounts of oxygen for this type of processes is air separation by cryogenic distillation.

A flow of high purity oxygen can be obtained by means of this technology, but its energy cost is high since it requires cooling the air to a very low temperature to then allow its distillation.

The cold oxygen obtained has then to be heated up prior to being fed into the oxycombustion chamber or the gasification unit.

Furthermore, the production cost of the oxygen obtained considerably increases with the desired purity, and the high energy consumption leads to additional $CO_2$ emissions.

It would therefore be advantageous to have a high-temperature (400° C.-900° C.) oxygen production process in order to limit the CO2 capture cost.

The U.S. Pat. No. 6,059,858 describes a process for producing oxygen at high-temperature by selective sorption of the oxygen in the air.

This is based on the CAR (Ceramic Autothermal Recovery) process according to which a ceramic material first reacts selectively with the oxygen in the air, and this oxygen is then desorbed by the material under the action of a decrease in the partial pressure of oxygen, created by placing the material under vacuum or by purging it with an inert gas (steam, CO2 or mixture) at constant temperature, referred to as "Pressure Swing Adsorption (PSA) process".

The sorption-desorption stages are repeated cyclically, and using several fixed-bed reactors arranged in parallel allows a sufficient oxygen-enriched $CO_2$/steam stream to be generated.

A variant of the ceramic regeneration stage consists in raising the temperature at constant partial pressure of oxygen (temperature swing process).

Patent FR 2,895,272 also describes a continuous process for producing oxygen at high-temperature based on the sorption/desorption properties of perovskite or fluorite type ceramics used in a rotating cylindrical reactor.

The efficiency of these processes first of all depends on the properties of the ceramic material used: oxygen selectivity, oxygen transfer capacity, sorption/desorption kinetics and physico-chemical stability.

These processes require using materials that react reversibly with oxygen according to the temperature and pressure conditions.

Several materials meeting these criteria are described in patent applications US-2005/0,176,588, US-2005/0,176,589 and US-2005/0,226,798, among which are perovskites, brownmillerites, supraconductive materials of YBaCuO type and mixed oxides of doped ceria type.

All these materials are known, within a certain temperature range, for their mixed ionic and electronic conduction properties (MIECs, Mixed Ionic Electronic Conductors) and they exhibit, in addition to these conduction properties, a relatively high oxygen sorption capacity.

The defects of the various structures (oxygen vacancies, interstitial oxygen sites) allow the materials to react with oxygen at high temperature (they become "laden" with oxygen) and to desorb all or part of this oxygen depending on the temperature and pressure conditions.

Patent US-2005/0,176,588 also claims the addition of simple metallic oxides (MOn, n=0.5, 1, 1.5, 2, and M=Cu, Co, Ni, Bi, Pb, V, Mn, Cr) to the MIEC type materials described above, in order to increase the oxygen transfer capacity of the composite material obtained.

To remedy the drawbacks mentioned hereinabove, the invention proposes materials that allow for producing a significant quantity of oxygen at high temperatures, advantageously comprised between 400 and 900° C.

The present invention thus relates to the materials $A_xBO_{2-\delta} \cdot yH_2O$, with $0<x\leq2$, $0\leq y\leq2$ and $-0.4\leq\delta\leq0.4$, for the adsorption and desorption of oxygen at high temperature (400° C.$\leq$T$\leq$900° C.) whose lamellar structure is composed of sheets generated by the sequence of octahedra connected to each other by the edges.

A is at least one of the elements IA or IIA of the periodic classification of elements and B is at least one of elements IIIB to IIB of the periodic classification of elements.

Advantageously, the element of group IIIB of the classification of elements is Mn.

Therefore, the materials are more particularly of the lamellar manganese oxide type $A_xMnO_{2-\delta} \cdot yH_2O$, with $0<x\leq2$, $0\leq y\leq2$ and $-0.4\leq\delta\leq0.4$, preferably with $0.2<x\leq1$, where A is an alkaline or alkaline-earth ion (elements IA or IIA of the periodic classification of elements) or a mixture of alkaline and/or alkaline-earth ions, and enable producing a substantial quantity of oxygen at temperatures comprised between 400 and 900° C.

Lamellar manganese oxides are also called "birnessites" with reference to the natural variety discovered in Birness in Scotland.

The compounds of the birnessite type have a bidimensional structure composed of sheets generated by the sequence of $MnO_6$ octahedra connected to each other by edges; they are also referred to as "Octahedral Layers". These compounds generally present a stoichiometry deviation due to the presence of heterovalent Mn cations ($Mn^{2+}$, $Mn^{3+}$, $Mn^{4+}$) and/or of sheet vacancies, compensated by the presence in the interlaminar space of hydrated cations, generally alkaline or alkaline-earth.

It is also possible to substitute partially the Mn ions with transition metal ions chosen among the elements of the groups IIIB to IIB of the classification of elements (according to the CAS notation). This stoichiometry deviation due to the presence of heterovalent Mn cations ($Mn^{2+}$, $Mn^{3+}$, $Mn^{4+}$) and/or of sheet vacancies, and/or the partial substitution of Mn ions with transition metal ions chosen among the elements of groups IIIB to IIB of the classification of elements (according to the CAS notation) is compensated by the presence in the interlaminar space of hydrated cations, whereby A is an element or a mixture of alkaline and alkaline-earth elements (groups IA and IIA of the periodic classification of elements).

It is also possible, in the case of materials whereby a portion of the Mn ions is substituted with an element or a mixture of elements chosen among the transition metals (groups IIIB to IIB of the classification of elements), that all or part of said cations be also present in the interlaminar spaces.

The value of δ varies as a function of the average degree of oxidation of the manganese (comprised between 3 and 4), of the charge variation caused by the potential substitution of Mn with one or several transition metals having an oxidation degree that is different from 4, and positive charges brought by the interlaminar cations A. When the material is subjected to a partial pressure diminution in oxygen at high temperature ($400°$ C. $\leq T \leq 900°$ C.), the emission of oxygen by the material causes an augmentation of δ and the reduction of manganese ions in order to maintain the electroneutrality of the material.

The estimation of the value of δ is thus uncertain and is connected to the definition of a reference state whereby the material would be considered as completely oxidized. In the literature relating to lamellar manganese oxides and to their preparation, the formula $A_xMnO_2 \cdot yH_2O$ (A=Na, K, Mg ...) is generally used indistinctly, insofar as the sorption/desorption property of the oxygen claimed by the invention has never been identified as a reversible phenomenon in which the lamellar structure is not altered. The non-stoichiometric character in oxygen of the birnessites is however reported by certain authors who propose formulas of the type $A_xMnO_2 \cdot yH_2O$, whereby y≠2.

The preparation of synthetic birnessites is described very well in numerous publications, a large variety of materials having a birnessite structure having been prepared with various processes of synthesis with the objective of using different properties, such as their ion exchange capacity, their catalytic properties, or their use as cathode materials for lithium batteries (J. Luo, S. L. Suib, J. Phys. Chem. B 1997, 101, 10403). The different synthesis protocols used lead to different lamellar manganese oxides, all, however, referred to as birnessites because of their lamellar arrangement of the manganese and of the periodicity of about 7 Å according to the direction, perpendicular to the plane of the sheets.

However, the materials obtained have X ray powder diffractograms, signature of their crystallographic structure, very different as a function of the mode of synthesis, and thus each correspond to different polytypes of a same mineral: the birnessite.

The birnessite can thus be obtained by oxidation of salts of the manganese II ($MnCl_2$, $MnSo_4$, $Mn(NO_3)_2$, $Mn(CH_3COO)_2$) by the oxygen or the hydrogen peroxide at low temperature ($25°$ C.) in basic medium (R. Giovaneli, E. Stahli, W. Feitknecht, Helv. Chim. Acta 1970, 53, 209). The oxidation of the salts of $Mn^{II}$ can also be carried out with potassium permanganate (J. Luo, S. L. Suib, J. Phys. Chem. B 1997, 101, 10403).

Thermal decomposition in dry air of $KMnO_4$ at high temperature ($800°$ C.) also enables obtaining a structure of the birnessite type (A. C. Gaillot, V. A. Drits, A. Manceau, B. Lanson, Microporous Mesoporous Materials 2007, 98, 267), as well as the reduction of $KMnO_4$ with a sugar or an organic acid (S. Ching, D. J. Petrovay, M. L. Jorgensen, S. L. Suib, Inorg. Chem. 1997, 36, 883).

The materials according to the invention generally have a specific surface comprised between 1 and 200 $m^2 \cdot g^{-1}$, preferably between 2 and 100 $m^2 \cdot g^{-1}$, and even more preferably between 20 and 80 $M^2 \cdot g^{-1}$.

When subjected to a constant temperature greater than or equal to $400°$ C. or to a diminution of the partial pressure of oxygen, the materials according to the invention release a certain portion of the network oxygen in the form of gas $O_2$, and a portion of the Mn cations are simultaneously reduced in order to provide the material with electroneutrality. The structure of the partially reduced material remains, however, of the birnessite type.

When the partially reduced material is subjected to a more substantial partial pressure of oxygen, it re-oxidizes.

At a constant partial pressure of oxygen, the materials, according to the invention, release a certain proportion of the network oxygen when the temperature to which they are subjected augments. A portion of the Mn cations is simultaneously reduced in order to provide the material with electroneutrality.

When the temperature diminishes, at the same partial pressure of oxygen, the material progressively re-oxidizes.

The materials according to the invention can be shaped by means of techniques known to one having ordinary skill in the art to obtain powders, beads, pellets, or extrudates.

They can be placed or directly prepared in the form of membranes on monolithic supports made of ceramics or metal.

In order to augment the quantity of material capable of collecting and releasing the oxygen back, the monolithic support itself can be constituted of a birnessite-type phase according to the invention, coated, or not, with another material according to the invention.

The implementation in the form of a membrane can be particularly interesting to use the properties of the material according to the invention.

Indeed, the materials according to the invention integrate oxygen to the crystal lattice when they are subjected to a partial pressure of oxygen and give up oxygen to the medium when the pressure diminishes. And yet, the implementation in the form of a membrane makes it possible to subject, in a continuous manner, the materials of the invention to different partial pressures on each of their surfaces. This results in a partial pressure gradient which constitutes a motive force for the separation of the oxygen. Making a membrane whose permeance would be provided by the materials according to the invention thus provides a means for continuous oxygen production.

The shaping of the materials is carried out by techniques known to one having ordinary skill in the art:
- the powders can be obtained, for example, by atomization or fluidized bed drying;
- the beads can be obtained by the technique referred to as granulation, or by the technique referred to as "oil-drop";
- the pellets can be obtained by pelletization,
- the extrudates by the extrusion technique;
- the placing on a metal or ceramic monolithic support can be carried out by the technique of suspension enduction;
- obtaining monoliths constituted by the materials of the invention can be carried out by extrusion.

The monolithic supports which can be implemented are:
- either made of material according to the invention;
- or made of ceramics whose main elements can be alumina, zirconia, cordierite, mullite, silica, aluminosilicate, or a combination of several of these compounds;
- or made of carbide and/or silicon nitride;
- or made of aluminium titanate;
- or made of metal generally obtained from iron, chrome and aluminium possibly doped by some nickel, some cobalt, some cerium or some yttrium.

The ceramic supports can have a honeycomb-type structure or be in the form of foam or fibers.

The ceramic supports can be made by coiling undulated sheets or by stacking metal sheets, also undulated, constituting a honeycomb structure having straight or zigzagged channels connected together, or not. They can also be made from fibers or tangled, woven, braided, or knitted metal strands.

As for the metal supports having aluminium in their composition, they can be subjected to a pretreatment at high temperature (for example between 700° C. and 1100° C.) to develop, at their surface, a micro-layer of refractory albumin. This superficial micro-layer has a porosity and a specific surface greater than that of the initial metal which promotes the entanglement of the active phase while protecting the rest of the support from corrosion.

The quantity of phase adsorbent placed or prepared directly on the ceramic or metal support (substrate) is generally comprised between 20 and 300 g per liter of said support and advantageously between 50 and 200 g per liter.

It can be advantageous to provide for the mixture of at least two materials according to the invention so as to extend the temperature range with which the materials can be used according to the process of oxygen production at high temperature.

EXAMPLES

Example 1

Comparative

The perovskite $La_{0.2}Sr_{0.8}Co_{0.6}Fe_{0.4}O_{3\pm\delta}$ (LSCF2864) has been prepared by precipitation of the nitrates of La, Sr, Co, and Fe by the sodium oxalate. After filtration and washing of the obtained precipitate, the latter has been calcinated at 1000° C. to form a perovskite whose X ray diffractogram corresponds to that of a perovskite of the type $SrCoO_3$ (card JCPDS n° 04-002-4432) and the elemental composition corresponds to the formula of LSCF2864, one of the most efficient materials (in presence of steam and/or $CO_2$) as described in the patents US2005/0176588, US 2005/0176589, and US2005/0226798. The specific surface of the material measured by adsorption of nitrogen according to the BET process is 8 $m^2/g$.

Example 2

The birnessite according to this example has been prepared by adding a solution containing 19.6 g of manganese acetate and 3.4 g of magnesium acetate to a strong solution of sodium hydroxide (5.5 mol/l) that is mechanically stirred. A solution containing 4.8 g of potassium permanganate is then added, under stirring, to the previously obtained suspension; then, the suspension is cured in an oven at 40° C. for 7 days. After filtration and washing with distilled water, the solid is dried at 80° C. for 24 hours.

The birnessite formula according to example 2, calculated from results of the ICP analysis of the sample by taking into consideration that the formula is of the type $A_xMnO_2 \cdot yH_2O$, is $Na_{0.62}Mg_{0.14}K_{0.02}MnO_2 \cdot 1.9H_2O$.

The X ray diffractogram of the solid confirms that it is a material having a birnessite structure, with an interlamellar distance on the order of 7.1 Å.

The material according to example 2 has also been calcinated at 500° C. for 2 hours. The DRX analysis confirms that the calcinated material still has a birnessite type structure, with an interlamellar distance on the order of 5.6 Å. This interlamellar distance is smaller than that of the dried material since the degree of hydration of the interlaminar cations is smaller due to the calcination.

The specific surface of the solid, measured by the BET process, is 47 $m^2/g$.

Example 3

(CEC213)

The birnessite according to example 3 has been prepared by adding a solution containing 23.5 g of manganese acetate to a strong solution of sodium hydroxide (5.5 mol/l) that is mechanically stirred. A solution containing 4.8 g of potassium permanganate is then added, under stirring, to the previously obtained suspension; then, the suspension is cured in an oven at 40° C. for 7 days. After filtration and washing with distilled water, the solid is dried at 80° C. for 24 hours.

The birnessite formula according to example 3, calculated from results of the ICP analysis of the sample by taking into consideration that the formula is of the type $A_xMnO_2 \cdot yH_2O$, is $Na_{0.38}K_{0.01}MnO_2 \cdot H_2O$.

The X ray diffractogram of the solid confirms that it is a material having a birnessite structure, with an interlamellar distance on the order of 7.1 Å.

The material according to example 2 has also been calcinated at 500° C. for 2 hours. The DRX analysis confirms that the calcinated material still has a birnessite type structure, with an interlamellar distance on the order of 5.6 Å. This interlamellar distance is smaller than that of the dried material since the degree of hydration of the interlaminar cations is smaller due to the calcination.

The specific surface of the solid, measured by the BET process, is 58 $m^2/g$.

Example 4

The birnessite according to example 4 has been prepared by adding a solution containing 19.6 g of manganese acetate and 2.3 g of calcium nitrate to a strong solution of sodium hydroxide (5.5 mol/l) that is mechanically stirred. A solution containing 4.8 g of potassium permanganate is then added, under stirring, to the previously obtained suspension; then, the suspension is cured in an oven at 40° C. for 7 days. After filtration and washing with distilled water, the solid is dried at 80° C. for 24 hours.

The birnessite formula according to example 4, calculated from results of the ICP analysis of the sample by taking into consideration that the formula is of the type $A_xMnO_2.yH_2O$, is $Na_{0.27}Ca_{0.1}K_{0.01}MnO_2.H_2O$.

The X ray diffractogram of the solid confirms that it is a material having a birnessite structure, with an interlamellar distance on the order of 7 Å.

The specific surface of the solid, measured by the BET process, is 29 m²/g.

Example 5

(VGN16b)

The birnessite according to example 5 has been prepared by adding a solution containing 19.6 g of manganese acetate and 2.6 g of copper nitrate to a strong solution of sodium hydroxide (5.5 mol/l) that is mechanically stirred. A solution containing 4.8 g of potassium permanganate is then added, under stirring, to the previously obtained suspension; then, the suspension is cured in an oven at 40° C. for 7 days. After filtration and washing with distilled water, the solid is dried at 80° C. for 24 hours.

The birnessite formula according to example 5, calculated from results of the ICP analysis of the sample by taking into consideration that the formula is of the type $A_xMnO_2.yH_2O$, is $Na_{0.28}Cu_{0.1}K_{0.04}MnO_2.1.9H_2O$.

The X ray diffractogram of the solid confirms that it is a material having a birnessite structure, with an interlamellar distance on the order of 7 Å.

The specific surface of the solid, measured by the BET process, is 33 m²/g.

Example 6

The birnessite according to example 6 has been prepared by calcination of potassium permanganate at 800° C. First, the permanganate is finely grinded, then it is spread in thin layer over a tray. The powder is then calcinated at 800° C. for 5 hours.

The birnessite formula according to example 6, calculated from results of the ICP analysis of the sample by taking into consideration that the formula is of the type $A_xMnO_2.yH_2O$, is $KMnO_2.H_2O$.

The X ray diffractogram of the solid confirms that it is mostly a material having a birnessite structure, with an interlamellar distance on the order of 6.9 Å.

The specific surface of the solid, measured by the BET process, is 3 m²/g.

Example 7

The birnessite according to example 7 has been prepared by adding a solution containing 30 g of sodium permanganate to a strong solution (250 g/l) of glucose that is mechanically stirred. A brown gel is formed during an exothermic reaction. After cooling, the gel is dried at 110° C. for 24 hours, then calcinated for 2 hours at 400° C. The obtained compound is then washed and dried at 110° C.

The birnessite formula according to example 7, calculated from results of the ICP analysis of the sample by taking into consideration that the formula is of the type $A_xMnO_2.yH_2O$, is $Na_{0.29}K_{0.03}MnO_2.0.9H_2O$.

The X ray diffractogram of the solid confirms that it is a material having a birnessite structure, with an interlamellar distance on the order of 7 Å.

The specific surface of the solid, measured by the BET process, is 39 m²/g.

Measurement of the Oxygen Transfer Capacity Under PSA Conditions of the Oxides Prepared in Examples 1 to 7

A SETARAM TAG24 thermobalance is equipped with a gas delivery automaton allowing simulating the successive sorption/desorption stages of the oxygen undergone by the particles in a CAR type process.

The tests are carried out at different temperatures (500, 600, 700, and 800° C.), with 20 mg (±2 mg) sample contained in a Pt boat.

In order to allow a comparison between the various samples, the size distribution of the particles is selected between 30 and 40 μm by screening.

The desorption gas of the oxygen that is used is pure nitrogen, and the regeneration gas is dry air.

The temperature rise occurs under air, at a flow rate of 150 ml/min. When the system has reached the set temperature value, after a 5-minute stabilization under air, some air/nitrogen/air cycles are carried out. The oxygen transfer capacity of the materials is measured at four different temperature settings: 500, 600, 700, and 800° C.

FIG. 1 compares the mass variations measured at different temperatures with the materials of example 1 (comparative) and of example 3.

With the material according to example 1 (comparative), the transfer capacity of oxygen measured at different temperature settings varies from 0.6 to 0.9% of the mass, the maximum capacity being obtained at 700° C. With the material according to example 3, the maximum oxygen transfer capacity is more significant (1.5% of the mass) and is obtained at 500° C., which presents an important advantage for the implementation of the oxygen production technology according to the PSA process, because of a less significant associated energetic penalty and the possibility of using less expensive materials to carry out installations. At 600° C., a significant diminution of the oxygen transfer capacity is observed with the material according to example 3 (0.2% of the mass), then the capacity augments with the temperature (0.8% and 1.2% of the mass at 700° C. and 800° C. respectively).

The results of the tests carried out at different temperatures with dry gas are regrouped in Table 1 hereinafter, which shows the oxygen transfer capacity of different materials prepared as a function of the test temperature. The oxygen transfer capacity is calculated at each temperature by difference between the regenerated mass (after contact with air) and the mass of the partially reduced material (after contact with nitrogen), divided by the mass of the sample at 500° C.

The material according to example 2 has an oxygen transfer capacity at 500 and 600° C. that is significantly more elevated than that of the comparative example.

The material according to example 3 has an oxygen transfer capacity that is more significant, at 500 and 800° C.

The materials according to the examples 4 and 5 have an oxygen transfer capacity on the same order of magnitude as the material of the comparative example.

The very significant oxygen transfer capacity (comparatively to example 1) of the materials according to the examples 2, 3, 6, and 7 at 500° C. is a major advantage of the materials according to the invention. Indeed, the energetic penalty related to the use of the materials is less significant at 500° C. than at a higher temperature. Furthermore, carrying out an oxygen production process at 500° C. requires a less significant investment than at 800° C. or more, since the specifications of the usable construction materials are less demanding.

In the case where the process requires a material whose oxygen transfer capacity is high in a temperature range comprised between 500° C. and 800° C., the association of the materials according to the examples 2 to 7 could be envisioned.

TABLE 1

| | Oxygen transfer capacity (% of the mass) | | | | | | |
|---|---|---|---|---|---|---|---|
| T ° C. | Example 1 (comparative) | Example 2 | Example 3 | Example 4 | Example 5 | Example 6 | Example 7 |
| 500 | 0.6 | 1.3 | 1.5 | 0.4 | 0.4 | 1.3 | 1.0 |
| 600 | 0.75 | 0.9 | 0.2 | 0.7 | 0.7 | 0.3 | 0.5 |
| 700 | 0.9 | 0.2 | 0.8 | 0.8 | 0.8 | 0.7 | 1.2 |
| 800 | 0.8 | 0.2 | 1.2 | 0.9 | 0.9 | 0.7 | 1.5 |

The present invention is not limited to the examples described hereinabove, but rather encompasses all variants and equivalents.

The invention claimed is:

1. A process for producing oxygen at high temperature with an oxygen separation material comprising at least one compound responding to the formula $A_xBO_{2-\delta}yH_2O$ having a lamellar structure composed of sheets generated by the sequence of octahedra connected to one another by the edges, whereby A is at least one of the elements IA or IIA of the periodic classification of element, B is at one of the elements IIIB to IIB of the periodic classification of the elements, wherein B includes Mn, $0<x\leq 2$, $0\leq y\leq 2$, and $-0.4\leq \delta\leq 0.4$, wherein: the partial pressure of oxygen on the material is diminished or the temperature to which the material is subjected is augmented so it releases a portion of its network oxygen in the form of gas $O_2$; then said material is subjected to a higher partial pressure of oxygen or this temperature is diminished so it re-oxidizes.

2. A process according to claim 1, characterized in that the formula of the compound $A_xBO_{2-\delta}yH_2O$ is such that $0.2<x\leq 1$.

3. A process according to claim 1, characterized in that the separation material has a specific surface comprised between 1 and 200 $m^2 \cdot g^{-1}$.

4. A process according to claim 1, characterized in that the separation material is used in the form of a powder, beads, pellets.

5. A process according to claim 1, characterized in that the separation material is used in the form of an extrudate.

6. A process according to claim 1, wherein the separation material is used in the form of a membrane in order to produce oxygen continuously.

7. A process according to one of the previous claims wherein the temperature is comprised between 400° C. and 900° C.

8. A process according to claim 1, characterized in that the separation material has a specific surface comprised between 2 and 100 $m^2 \cdot g^{-1}$.

9. A process according to claim 1, characterized in that the separation material has a specific surface comprised between 20 and 80 $m^2 \cdot g^{-1}$.

* * * * *